US006834425B2

(12) United States Patent
Budig et al.

(10) Patent No.: US 6,834,425 B2
(45) Date of Patent: Dec. 28, 2004

(54) ASSEMBLY MACHINE

(75) Inventors: Peter Klaus Budig, Chemnitz (DE); Wolfgang Weis, Neckartenzlingen (DE); Otto Diederich, Heiligenstadt (DE); Jörg Döring, Heiligenstadt (DE); Mario Franke, Reinshardshagen (DE)

(73) Assignee: AKB Automationskomponenten & Basismaschinen GmbH & Co. KG, Heiligenstadt (DE)

( * ) Notice: Subject to any disclaimer, the term of this patent is extended or adjusted under 35 U.S.C. 154(b) by 176 days.

(21) Appl. No.: 10/353,255

(22) Filed: Jan. 28, 2003

(65) Prior Publication Data

US 2003/0182795 A1 Oct. 2, 2003

(30) Foreign Application Priority Data

Feb. 6, 2002 (DE) .......................................... 102 04 965

(51) Int. Cl.[7] .............................................. B23P 19/00
(52) U.S. Cl. ........................ 29/791; 29/792; 29/48.5 R; 29/33 J; 29/281.4; 29/434; 269/289 R; 248/349.1
(58) Field of Search .......................... 29/428, 434, 462, 29/37 R, 38 A, 38 B, 35.5, 39, 40, 48.5 R, 49, 33 J, 700, 709, 711, 791, 792, 281.1, 281.4; 269/289 R, 290; 248/349.1

(56) References Cited

U.S. PATENT DOCUMENTS 5,240,746 A * 8/1993 O'Connell Litteral ...... 427/510
6,609,042 B1 * 8/2003 Kumeth ...................... 700/116

FOREIGN PATENT DOCUMENTS

DE 43 28 988 3/1995
JP 55112736 A * 8/1980 ........... B23P/21/00

* cited by examiner

Primary Examiner—David P. Bryant
Assistant Examiner—Jermie E. Cozart
(74) Attorney, Agent, or Firm—Collard & Roe, P.C.

(57) ABSTRACT

An assembly machine comprises a machine frame, a plurality of work stations arranged on a circular carrier plate secured on the surface of the machine frame, and a rotary dish that is rotationally driven in cycles and arranged concentrically with the carrier plate. The rotary dish protrudes along the circumference of the carrier plate and forms a ring-shaped support surface for work pieces that surround the carrier plate. The machine frame is a cast machine component that comprises a table-like substructure and a console on the top side with a ring-shaped mounting surface for receiving a drive for the rotary dish. The rotary dish drive is a direct drive that comprises a ring-shaped stator with electrical windings that is secured on the mounting surface, and a rotor fitted with permanent magnets. The rotor forms a carrier for and is detachably connected with the rotary dish.

10 Claims, 3 Drawing Sheets

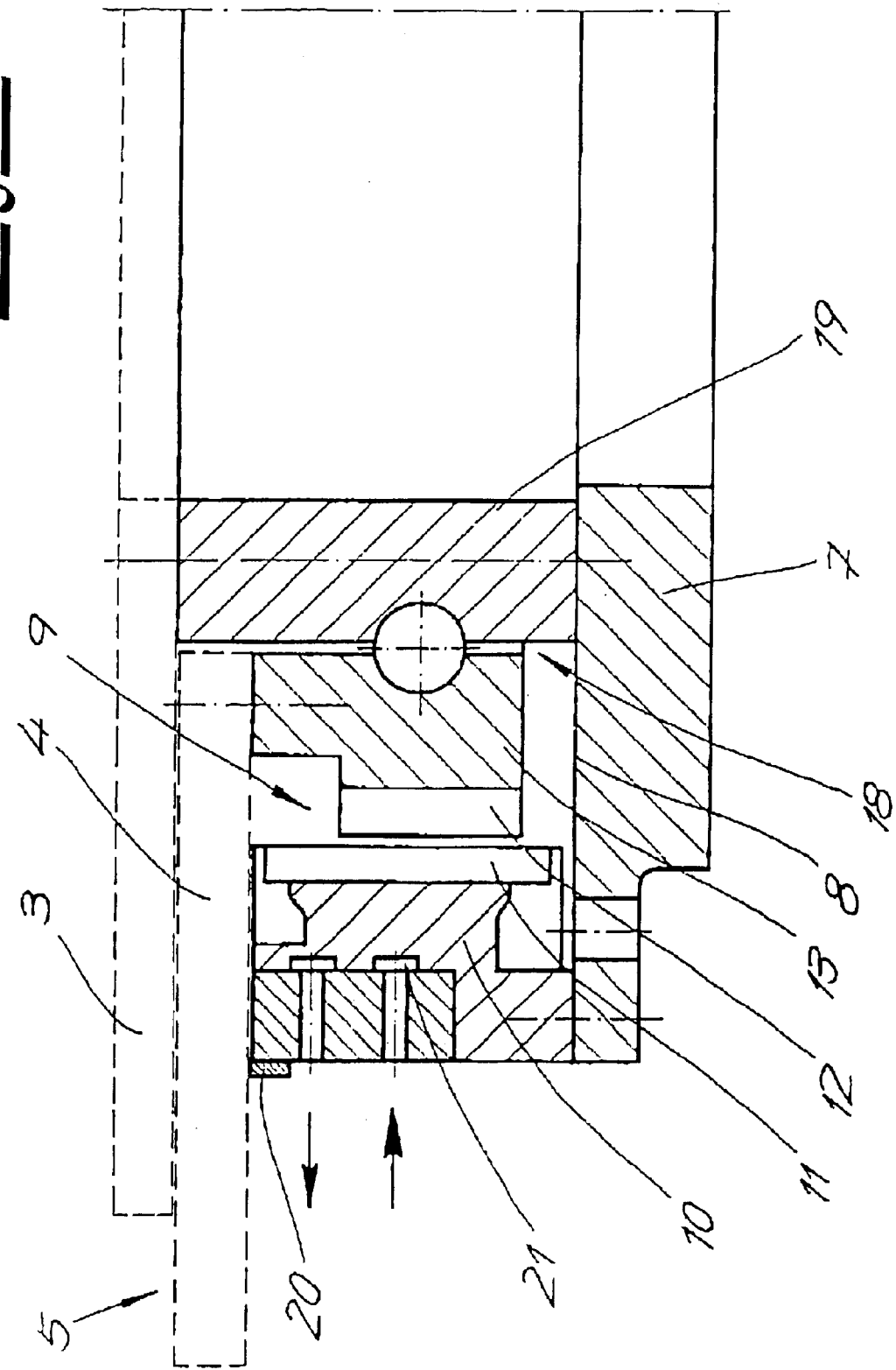

ASSEMBLY MACHINE

BACKGROUND OF THE INVENTION

1. Field of the Invention

The invention relates to an assembly machine comprising a machine frame, a plurality of work stations that are arranged on a circular carrier plate that is secured on the top side of the machine frame, and a rotary dish that is rotationally driven in cycles and arranged concentrically in relation to the carrier plate. The rotary dish protrudes over the circumference of the carrier plate and forms a support surface in the form of a ring for work pieces that surround the carrier plate.

2. The Prior Art

An assembly machine is described in DE-A 43 28, 988, in which the frame of the machine is realized in the form of a welded construction, and there is an electromechanical drive with a stopping-and-stepping gearing that serves as the drive for the rotary dish. The stopping-and-stepping gearing, with the rotary dish mounted on it, forms an independent subassembly. The stopping-and-stepping gearing has to be designed in different ways based on the diameter of the rotary dish and depending on the number of work stations or the stepping distance over which the rotary dish has to travel in one work cycle. Due to the fact that the assembly machine has to be precisely adapted to various applications with respect to the diameter of the rotary dish and the number of work stations present, the manufacture of an assembly machine can be started only after the specifications have been on the application side. In practical life, this frequently results in long delivery times.

SUMMARY OF THE INVENTION

It is therefore an object of the invention to provide a basic assembly machine that can be variably adapted to different assembly-tasks with respect to the size of the rotary dish and the stepping distance (or width) of one work cycle without having to make any constructional changes on the machine frame or the drive of the rotary dish.

Based on an assembly machine with the structure described above, the invention comprises a machine frame in the form of a cast part that has a table-like substructure and a top-side console with a ring-shaped mounting surface for receiving a drive for the rotary dish. The drive of the rotary dish is a direct drive that comprises a ring-shaped stator with electrical windings and being secured on the mounting surface, as well as a rotor fitted with permanent magnets. The rotor forms a carrier for the rotary dish and is connected with the dish in a detachable manner. The machine frame form of a cast component of the machine, and the drive of the rotary dish, form one functional subassembly that can be prefabricated.

The invention profits from the fact that the cast component has high dimensional stability, and that the mounting surface for receiving the drive of the rotary dish can be precisely worked. The rotor of the electrical direct drive, which is also referred to as a torque motor, supports the rotary dish on a ring-shaped support surface with a large diameter. Tilting movements of the rotary dish are excluded in this way.

Differently sized rotary dishes can be readily mounted on the support surface without having to fear any impairment with respect to its function. The division of the rotary dish and the speed of the rotational movement are determined by the programming of the torque motor and can be variably adapted to each individual application as required by changing the control software. Furthermore, the rotary dish can be divided in a manner that cannot be accomplished with a mechanical drive for constructional reasons.

The stator of the electrical direct drive may optionally have a segmented structure. A mechanical clamping or braking device may be provided, so that the rotary dish cannot move as work pieces positioned on the rotary dish are being processed in the work stations.

The table-like substructure of the cast component preferably comprises two lateral wings (or side structures) whose bottoms are secured on a base plate. For weight reasons, but also for improving the accessibility, the cast machine component may contain window-like recesses. A work plate for securing additional equipment and feed devices is usefully arranged on the table-like substructure. According to a preferred embodiment of the invention, the carrier plate and the rotary dish are in the form of ring-shaped plates, and drives and control devices are arranged within the table-like substructure for actuating assembly tools in the work stations. Cables leading to the work stations for controlling the assembly tools can be installed through the clear space of the carrier plate and the rotary dish.

According to a preferred embodiment of the invention, the rotor of the torque motor that is employed as the drive for the rotary dish consists of a bearing ring of an antifriction bearing arranged on the mounting surface. This bearing ring is fitted with permanent magnets. The antifriction bearing comprises a bearing ring fixed on the mounting ring, rollers, and a movable bearing ring that forms the rotor, which, as a sub-supplied component, can be manufactured with high precision.

According to a particularly preferred embodiment of the invention, the stator is an outer ring that has electrical windings on its circumferential surface on the inner side. The antifriction bearing ring forming the rotor is a component of an antifriction bearing that is arranged within the outer ring concentrically in relation to the latter. The outer ring may be structured as one single part or from segments.

According to a further development of the invention, the stator has cooling channels that can be accessed from the outside, and a gasket is arranged on the outer ring for sealing a gap between the stator and the rotary dish. With the stator comprising an outer ring, and with additional sealing versus the rotary dish, the antifriction bearing is protected against contamination. This design is also suitable for application in sterile rooms, for example in the field of medical technology. The carrier plate supporting the work stations may rest on the inner ring of the antifriction bearing that is arranged on the mounting surface in a fixed manner, and can be secured on the inner ring. This arrangement has a very simple construction.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 3 shows a section through the upper part of the assembly machine shown in FIG. 1.

DETAILED DESCRIPTION OF THE PREFERRED EMBODIMENT

Figure 1:
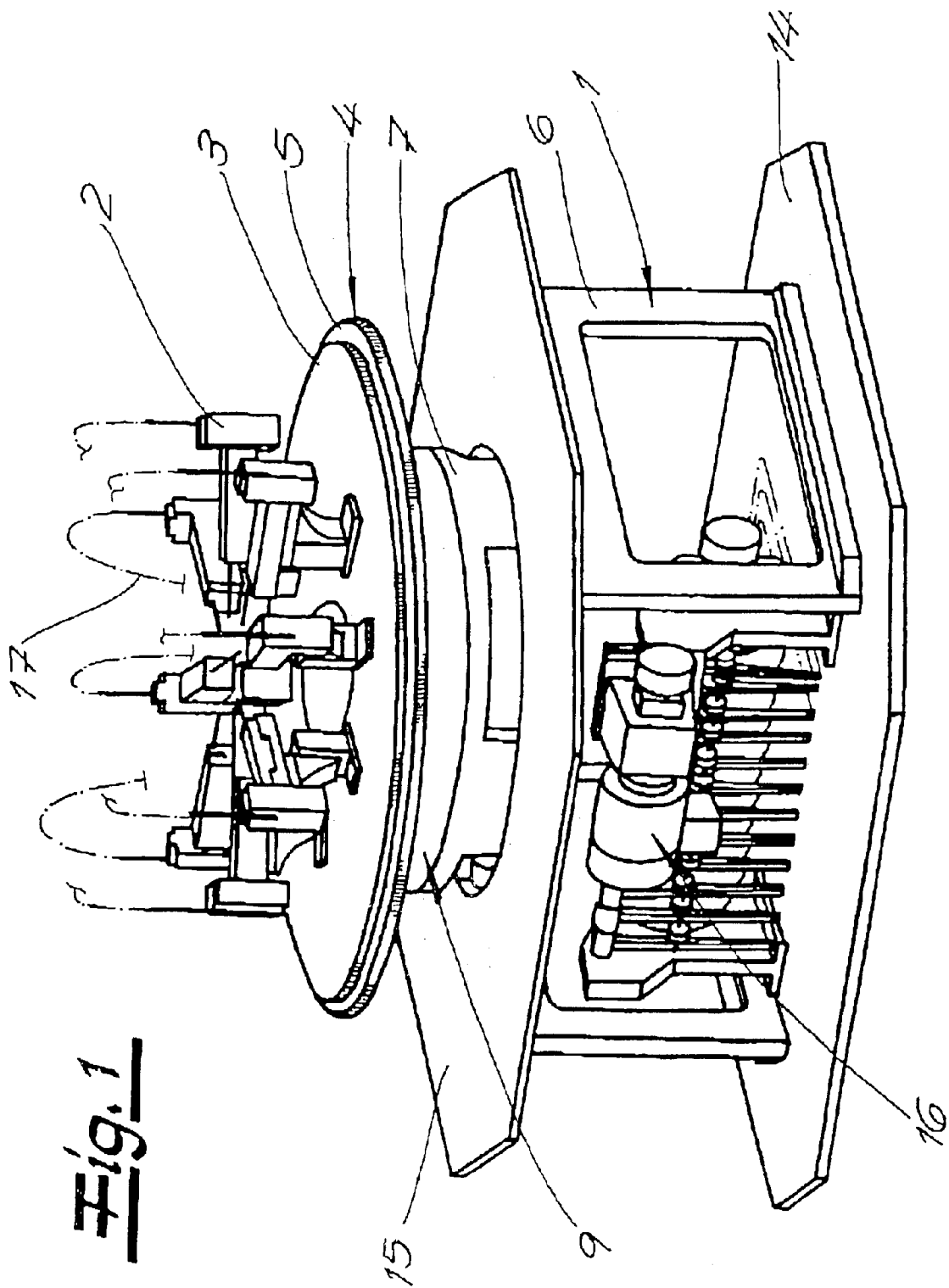
FIG. 1 shows a perspective representation of an assembly machine.

Referring now in detail to the drawings, the basic structure of the assembly machine shown in FIG. 1 is comprised of a machine frame 1, a plurality of the work stations 2, which are arranged on a circular carrier plate 3 that is secured on the machine frame 1, and a rotary dish 4 that is rotationally driven in cycles and arranged concentrically with carrier plate 3. Rotary dish 4 protrudes out from the periphery of carrier plate 3 and forms a support surface 5 for receiving work pieces, said support surface surrounding carrier plate 3 in the form of a ring.

Machine frame 1 is a cast component that is comprised of a table-like substructure 6 and a console 7 on the top side. Console 7 has a ring-shaped mounting surface 8 for receiving a drive 9 for driving the rotary dish. The rotary dish drive 9 is comprised of a torque motor, and is an electrical direct drive that comprises a ring-shaped stator 10 with electrical windings 11, secured on the mounting surface 8, and a rotor 13 that is fitted with permanent magnets 12. Rotor 13 forms a carrier for rotary dish 4 and is connected with the latter in a detachable manner. Machine frame 1 in the form of a cast component, and torque motor 9 arranged on the cast component form a basic assembly machine, on which application-related changes can be made by exchanging rotary dish 4 as well as carrier plate 3 for supporting work stations 2.

Figure 2:
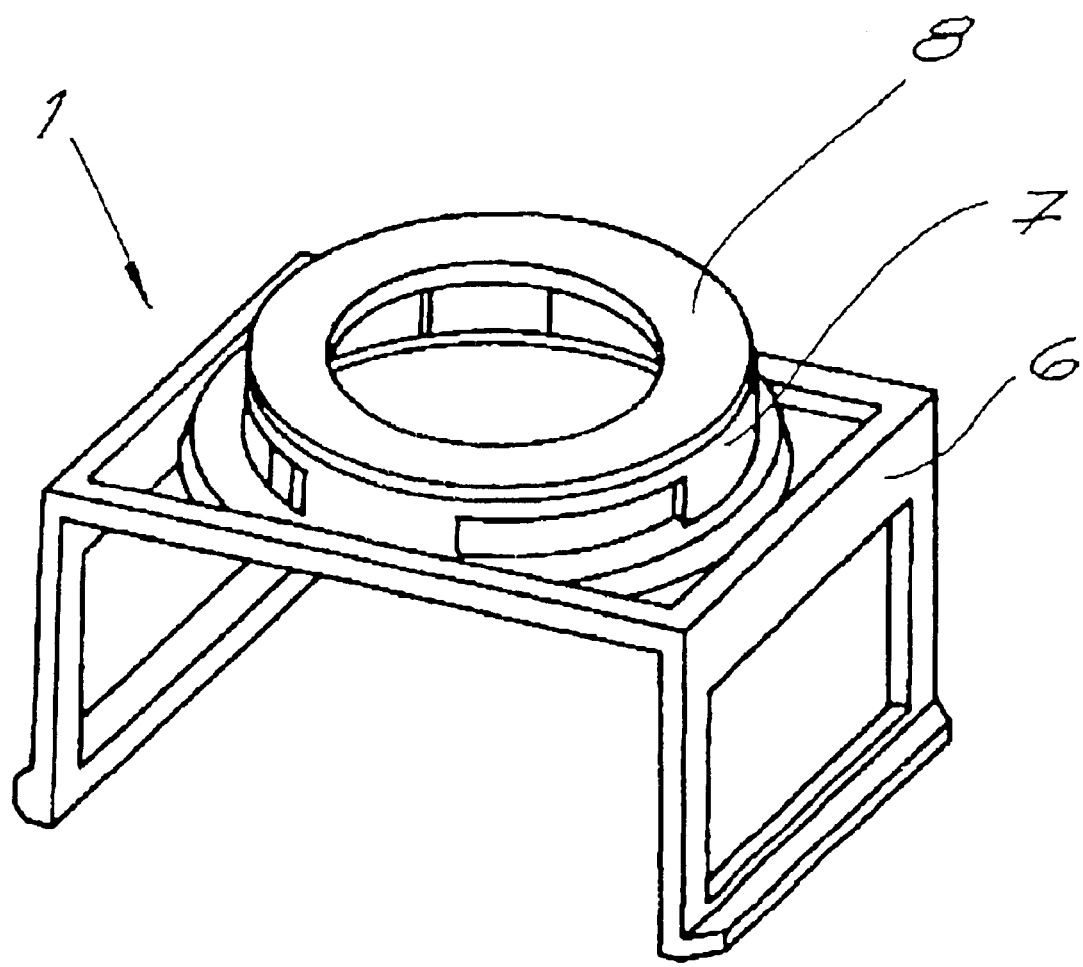
FIG. 2 shows the machine frame in the form of a cast component of the assembly machine shown in FIG. 1.

A comparative look at FIGS. 1 and 2 shows that the table-like substructure 6 of the cast machine component has two side wings that are secured at their bottom on a base plate 14, and that the cast part comprises window-like recesses. A work plate 15 for securing additional equipment and feed devices is arranged on table-like substructure 6. The drives and control devices 16 for actuating assembly tools in work stations 2 are arranged within table-like substructure 6 and connected to the assembly tools of the work stations 2 via cables 17. Carrier plate 3 and rotary dish 4 are realized in the form of ring-shaped disks, so that cables 17 leading to work stations 2 can be installed in bundles extending through the clear space. In a known manner, the drives and the control devices 16 accommodated within table-like substructure 6 may comprise a control shaft with cam disks that are mounted on the control shaft and associated with the individual work stations. The profile of these cam disks is tapped and transmitted by means of Bowden wires to the assembly tools as a setting signal.

According to a preferred exemplified embodiment that is shown in FIG. 3, rotor 13 of rotary dish drive 8 is comprised of a bearing ring of an antifriction bearing 18 that is arranged on mounting surface 8 of the cast component. The bearing ring is fitted with permanent magnets 12. The stator 10 is designed in the form of an outer ring that has electrical windings 11 arranged on its circumferential surface on an inner side. It is understood that stator 10 or outer ring may also have a segmented structure. The antifriction bearing ring forming rotor 13 is a component of the antifriction bearing 18 that is arranged within outer ring 10 on mounting surface 8 concentrically with said outer ring. Carrier plate 3 for work stations 2 may rest on inner ring 19—which is arranged on mounting surface 8 in a fixed manner—of antifriction bearing 18 and can be secured on said inner ring.

The outer ring forming the stator 10 protects antifriction bearing 18 against contamination. If necessary, a gasket 20 can be additionally arranged on outer ring 10. Gasket 10 seals a gap between stator 10 and rotary dish 4. In the arrangement shown in FIG. 3, it is also possible, furthermore, to cool the torque motor in a very simple manner. Stator 10 has cooling channels 21 for that purpose, which are accessible from the outside.

The cycled setting movements of the torque motor are controlled by a controller, which is not shown. The adjusting movements can be variably adapted to different applications by means of the control software. The torque motor can be equipped with an incremental measuring system. Furthermore, there can be mechanical clamping and/or braking devices that are actuated in time with the work cycle of the machine and prevent the rotary dish from moving as assembly work is being carried out in the work stations.

Accordingly, while only a few embodiments of the present invention have been shown and described, it is obvious that many changes and modifications may be made thereunto without departing from the spirit and scope of the invention.

What is claimed is:

1. An assembly machine comprising:
    a cast machine frame comprising a table substructure, a console located on a top side of said machine frame, and a ring-shaped mounting surface;
    a plurality of work stations arranged on a circular carrier plate which is secured on a top side of the machine frame; and
    a rotary dish arranged concentrically with and protruding out from a circumference of the carrier plate and forming a support surface for work pieces, said support surface surrounding the carrier plate in the form of a ring; and
    a rotary dish drive in the form of a direct drive and comprising:
        (a) a ring-shaped stator secured on the mounting surface for driving the rotary dish in cycles;
        (b) electrical windings; and
        (c) a rotor fitted with permanent magnets, said rotor forming a carrier for the rotary dish and being detachably connected with the rotary dish.

2. The assembly machine according to claim 1, wherein the table substructure of the cast component comprises two lateral wings secured on a bottom side to a base plate of said machine frame.

3. The assembly machine according to claim 1, wherein the machine frame has window recesses.

4. The assembly machine according to claim 1, further comprising a work plate for securing additional equipment and feed devices arranged on the table substructure.

5. The assembly machine according to claim 1, wherein the carrier plate and the rotary dish are in the form of ring disks, and further comprising:
    drives and control devices for actuating assembly tools in the work stations disposed within the table substructure; and
    cables for controlling the assembly tools, said cables being installed through a clear space of the carrier plate and the rotary dish, said cables leading to the work stations.

6. The assembly machine according to claim 1, wherein the rotor of the rotary dish drive comprises a bearing ring arranged on the mounting surface, said bearing ring being fitted with permanent magnets.

7. The assembly machine according to claim 6, wherein the stator comprises an outer ring having electrical windings arranged on an inner side of its circumferential surface, and wherein the bearing ring is a component of an antifriction bearing arranged on the mounting surface within and concentrically with the outer ring.

8. The assembly machine according to claim 7, wherein the carrier plate for the work stations rests on an inner ring of the antifriction bearing and is secured on said inner ring in a fixed manner, said inner ring being arranged fixed on the mounting surface.

9. The assembly machine according to claim 7, wherein the stator has cooling channels which are accessible from the outside the stator.

10. The assembly machine according to claim 7, further comprising a gasket arranged on the stator, said gasket sealing a gap between the stator and the rotary dish.

* * * * *